United States Patent
Nodera

(10) Patent No.: US 11,118,527 B2
(45) Date of Patent: Sep. 14, 2021

(54) INTERNAL COMBUSTION ENGINE CONTROL SYSTEM

(71) Applicant: DENSO CORPORATION, Kariya (JP)

(72) Inventor: Masato Nodera, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/938,388

(22) Filed: Jul. 24, 2020

(65) Prior Publication Data

US 2020/0355138 A1 Nov. 12, 2020

Related U.S. Application Data

(63) Continuation of application No. PCT/JP2018/044106, filed on Nov. 30, 2018.

(30) Foreign Application Priority Data

Jan. 26, 2018 (JP) .............................. JP2018-011903

(51) Int. Cl.
*F02D 41/22* (2006.01)
*F02D 41/30* (2006.01)
(Continued)

(52) U.S. Cl.
CPC ...... *F02D 41/3011* (2013.01); *F02D 41/0002* (2013.01); *F02D 41/009* (2013.01);
(Continued)

(58) Field of Classification Search
CPC .. F02D 41/22; F02D 41/3029; F02D 41/3064; F02D 41/307; F02D 2200/0404;
(Continued)

(56) References Cited

U.S. PATENT DOCUMENTS

2003/0015169 A1* 1/2003 Heslop ................ F02D 41/3029
123/295
2008/0288160 A1 11/2008 Murakami
(Continued)

FOREIGN PATENT DOCUMENTS

JP 2008-38865 2/2008
JP 4338900 10/2009
(Continued)

*Primary Examiner* — Erick R Solis
(74) *Attorney, Agent, or Firm* — Nixon & Vanderhye P.C.

(57) ABSTRACT

A control unit controls a combustion state of an internal combustion engine in accordance with a drive torque requested by a driver. The control unit performs a switching control to switch at least a combustion state between lean-burn combustion and stoichiometric combustion. A monitor unit performs torque monitoring to determine abnormality of a request torque, which is requested to the internal combustion engine, and a generated torque of the internal combustion engine based on the request torque and an estimation torque, which is an estimation value of an actual torque of the internal combustion engine. A combustion state determining unit determines whether the combustion state in the control unit is the lean-burn combustion or the stoichiometric combustion. A computing unit computes the estimation torque in accordance with the combustion state determined by the combustion state determining unit.

10 Claims, 7 Drawing Sheets

(51) Int. Cl.
*F02D 41/00* (2006.01)
*G01M 15/04* (2006.01)

(52) U.S. Cl.
CPC ........... *F02D 41/22* (2013.01); *F02D 41/307* (2013.01); *F02D 41/3029* (2013.01); *G01M 15/044* (2013.01); *F02D 2200/0404* (2013.01); *F02D 2200/0406* (2013.01); *F02D 2200/0602* (2013.01); *F02D 2200/0614* (2013.01); *F02D 2200/0618* (2013.01); *F02D 2200/602* (2013.01)

(58) Field of Classification Search
CPC ...... F02D 2200/1004; F02D 2200/602; G01M 15/044
USPC ........................ 701/105; 123/295; 73/114.15
See application file for complete search history.

(56) References Cited

U.S. PATENT DOCUMENTS

| | | | | |
|---|---|---|---|---|
| 2010/0275877 A1* | 11/2010 | Ramappan | .......... | F02D 41/3035 |
| | | | | 123/295 |
| 2011/0238280 A1* | 9/2011 | Shibata | ............... | F02D 41/3035 |
| | | | | 701/102 |
| 2016/0115892 A1* | 4/2016 | Tanaka | ................ | F02D 41/0002 |
| | | | | 123/406.46 |

FOREIGN PATENT DOCUMENTS

| JP | 4957930 | 6/2012 |
|---|---|---|
| JP | 2015-137642 | 7/2015 |

* cited by examiner

INTERNAL COMBUSTION ENGINE CONTROL SYSTEM

CROSS REFERENCE TO RELATED APPLICATION

The present application is a continuation application of International Patent Application No. PCT/JP2018/044106 filed on Nov. 30, 2018, which designated the U.S. and claims the benefit of priority from Japanese Patent Application No. 2018-011903 filed on Jan. 26, 2018. The entire disclosures of all of the above applications are incorporated herein by reference.

TECHNICAL FIELD

The present disclosure relates to an internal combustion engine control system.

BACKGROUND

Conventionally, an internal combustion engine control system has a configuration to acquire various information such as torque of an internal combustion engine.

SUMMARY

According to one aspect of the present disclosure, an internal combustion engine control system comprises a control unit configured to control a combustion state of an internal combustion engine and to perform a switching control to switch at least the combustion state between lean-burn combustion and stoichiometric combustion.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
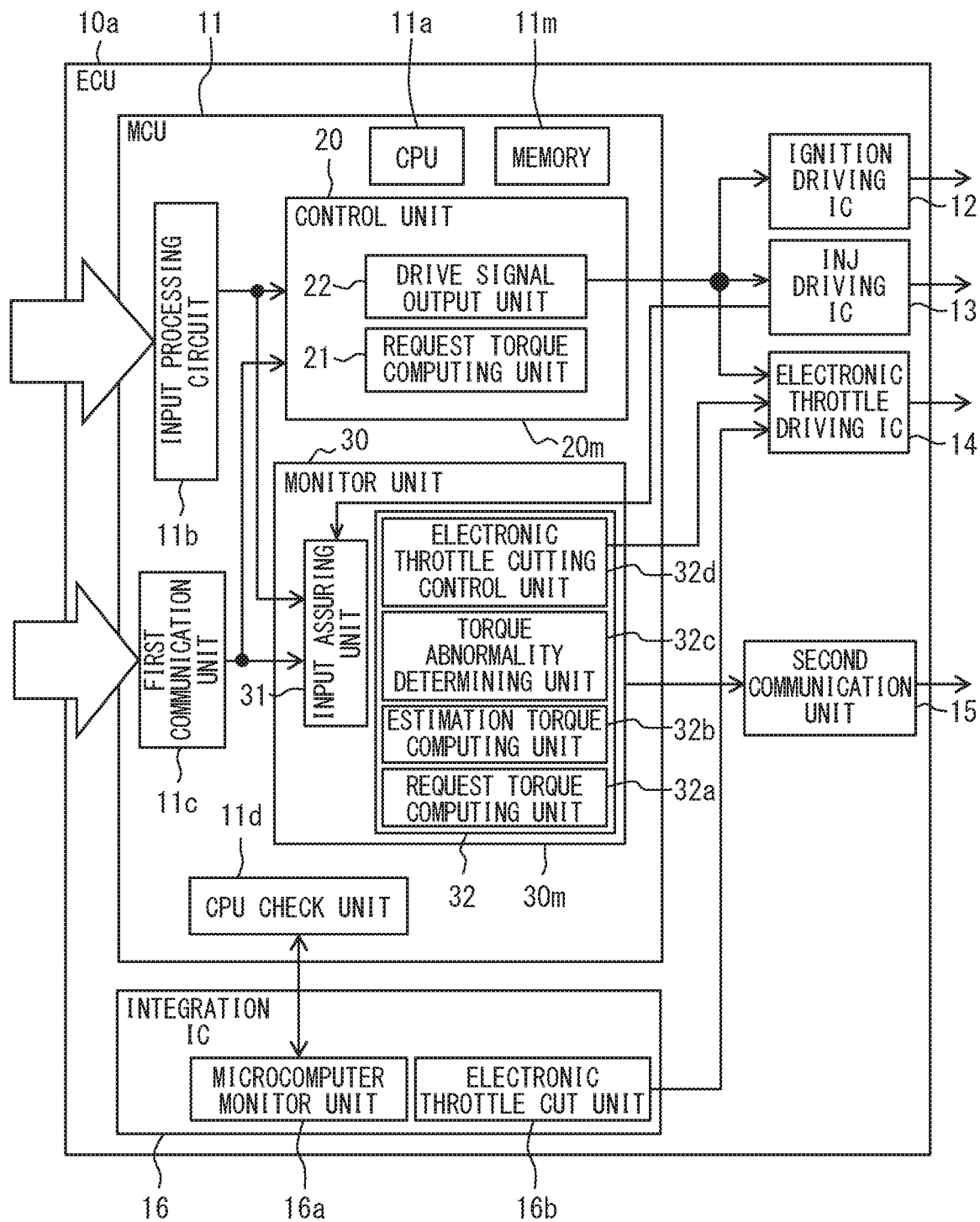
FIG. 1 is a block diagram illustrating a schematic configuration of an ECU in a first embodiment.

As follows, examples of the present disclosure will be described According to one example of the present disclosure, an internal combustion engine control system has a configuration to acquire actual torque and to compare the actual torque with maximum allowable torque and, when the actual torque exceeds the maximum allowable torque, starting an error reaction.

In order to satisfy a strict fuel consumption regulation imposed on an internal combustion engine system, it is conceivable to employ an internal combustion engine control system that is configured to perform a control to switch a combustion state of the internal combustion engine between lean-burn combustion and stoichiometric combustion in accordance with a travel state.

According to an assumable configuration, it is conceivable to employ an internal combustion engine control system that includes a control unit that performs control on an internal combustion engine and further includes a monitor unit that performs torque monitoring and determines abnormality in required torque and generated torque by comparing the required torque and estimated torque. In this assumable configuration, the monitor unit may compute an estimated torque based on a fuel injection amount or an air intake amount.

It is noted that, a thermal efficiency at the time of lean-burn combustion and a thermal efficiency at the time of stoichiometric combustion are different. Therefore, a torque characteristic at the time of lean-burn combustion and a torque characteristic at the time of stoichiometric combustion are different. Consequently, a concern arises that in a case where the monitor unit computes an estimated torque without consideration of the combustion state controlled by the control unit, the estimated torque may not be computed accurately and torque monitoring may not be performed accurately.

In consideration of this issue, according to one example of the present disclosure, an internal combustion engine control system comprises a control unit configured to control a combustion state of an internal combustion engine based on a drive torque of the internal combustion engine requested by a driver and to perform a switching control to switch at least the combustion state between lean-burn combustion and stoichiometric combustion. The internal combustion engine control system further comprises a monitor unit configured to perform torque monitoring to determine abnormality of a request torque, which is requested to the internal combustion engine, and a generated torque of the internal combustion engine based on the request torque and an estimation torque, which is an estimation value of an actual torque of the internal combustion engine. The monitor unit includes a combustion state determining unit configured to determine whether the combustion state in the control unit is the lean-burn combustion or the stoichiometric combustion. The monitor unit further includes a computing unit configured to compute the estimation torque in accordance with the combustion state determined by the combustion state determining unit.

In the following, with reference to the drawings, a plurality of embodiments for carrying out the present disclosure will be described. In each of the embodiments, in some cases, the same reference numeral is designated to a part corresponding to a matter described in a foregoing embodiment and repetitive description will not be given. In each of the embodiments, in the case where only a part of the configuration is described, for the other part of the configuration, another embodiment described before may be referred to and applied.

First Embodiment

FIG. 1 illustrates an ECU 10a which is an electronic control unit mounted in a vehicle and controls operation of an internal combustion engine mounted in the vehicle. In the embodiment, an example of applying an internal combustion engine control system to the ECU 10*a* is employed. Although the internal combustion engine according to the embodiment is a gasoline engine of a spark-ignition type, it may be a diesel engine of a self-ignition type. In the following, the internal combustion engine will be also simply written as an engine.

The ECU 10*a* has an MCU (Micro Controller Unit) 11, an ignition driving IC 12, a fuel injection valve driving IC 13, an electronic throttle driving IC 14, a second communication unit 15, an integration IC 16, and the like.

The MCU 11 has a CPU 11*a* as an arithmetic processing unit, a memory 11*m* as a storage medium, an input processing circuit 11*b*, a first communication unit 11*c*, a CPU check unit 11*d*, and the like. The MCU 11 also has a control unit 20 and a monitor unit 30. Those are functions provided by the CPU 11*a* and the memory 11*m* which are common. That is, the CPU 11*a* and the memory 11*m* when a control program stored in a storage region 20*m* for control in the memory 11*m* is executed by the CPU 11*a* function as the control unit 20. On the other hand, the CPU 11*a* and the memory 11*m*, when a monitoring program stored in a storage region 30*m* for monitoring in the memory 11*m* is executed by the CPU 11*a*, function as the monitor unit 30. The storage region 20*m* for control and the storage region 30*m* for monitoring are set separately in different regions in the storage region of the memory 11*m*.

However, the present disclosure is not limited to the above. The ECU 10*a* may have the control unit 20 including a CPU and a memory and the monitor unit 30 including a CPU and a memory different from those in the control unit 20.

In the example illustrated in FIG. 1, in the MCU 11, the CPU 11*a*, the memory 11*m*, the input processing circuit 11*b*, the first communication unit 11*c*, and the CPU check unit 11*d* are integrated on a single semiconductor chip. However, they may be integrated dispersedly on a plurality of semiconductor chips. In the case where they are integrated dispersedly on a plurality of semiconductor chips, the plurality of semiconductor chips may be mounted on a common substrate, or a semiconductor chip may be mounted on each of a plurality of substrates. Further, semiconductor chips may be housed in a common single casing or different casings.

The memory 11*m* is a storage medium storing a program and data and includes a non-transitory substantial storage medium for non-temporarily storing a program which may be read by the CPU 11*a*. A storage medium may be provided as a semiconductor memory, a magnetic disk, or the like. A program stored in the memory 11*m* is executed by the CPU 11*a*, thereby making the ECU 10*a* function as a device described in the specification and making a control device function to execute a method described in the specification. The memory 11*m* may include a storage medium temporarily storing data.

A device and/or functions provided by a control device may be provided as software stored in a substantial storage medium and a computer executing the software, only software, only hardware, or a combination of them. For example, when the control device is provided as an electronic circuit as hardware, it may be provided as a digital circuit including a number of logic circuits or an analog circuit.

For example, an accelerator position sensor 41, a crank sensor 42, an air flow sensor (air flowmeter) 43, and the like are electrically connected to the input processing circuit 11*b* in the MCU 11. An external ECU is electrically connected to the first communication unit 11*c* in the MCU 11. Therefore, sensor signals from the various sensors and an external signal from the external ECU are input to the MCU 11. To the input processing circuit 11*b*, in addition to the sensors 41 to 43, a throttle sensor, a water temperature sensor, an intake manifold pressure sensor, and the like may be electrically connected.

The accelerator position sensor 41 outputs an electric signal according to an accelerator operation amount by the driver of the vehicle. The electric signal is, for example, a voltage signal. The MCU 11 computes a stroke amount of the acceleration pedal operated by the driver of the vehicle, that is, the driver of the engine on the basis of the sensor signal from the accelerator position sensor 41.

The crank sensor 42 outputs a pulse-shaped sensor signal in accordance with the rotation of the crankshaft (output shaft) of the engine. The MCU 11 computes the rotational speed per unit time of the crankshaft, that is, the engine rotational speed on the basis of the sensor signal from the crank sensor 42. The MCU 11 performs cylinder discrimination on the basis of sensor signals from the cam sensor and the crank sensor 42. The engine rotational speed corresponds to rotational speed of the internal combustion engine. It may be also said that the crank sensor 42 outputs a crank angle signal as a sensor signal according to the rotational position of the crank shaft of the engine.

The air flow sensor 43 corresponds to an air flow rate sensor and outputs a signal according to an intake air amount of the engine. The MCU 11 computes an intake flow rate and flow rate on the basis of a sensor signal output from the air flow sensor 43. The intake flow rate is a parameter used for computation of estimation torque. The intake flow rate corresponds to an air flow rate and is also simply called an intake amount.

An external signal output from the external ECU is, for example, a signal expressing an operation state of an auxiliary machine using the output shaft of the engine as a drive source. A concrete example of the auxiliary machine is a refrigerant compressor of an air conditioner which air-conditions the inside of the vehicle, which is a compressor using the output shaft of the engine as a drive source.

The ignition driving IC 12 is electrically connected to an ignition device. The ignition driving IC 12 has a switching element controlling power supply to the ignition device of the engine and interruption of the power supply. The MCU 11 outputs an instruction signal to the switching element. Specifically, the MCU 11 computes a target ignition timing as a target value of the timing of making discharge ignition by the ignition device on the basis of the above-described various signals, and outputs an instruction signal to the ignition driving IC 12 in accordance with the computed target ignition timing. In other words, the target ignition timing is a required ignition timing.

Figure 2:
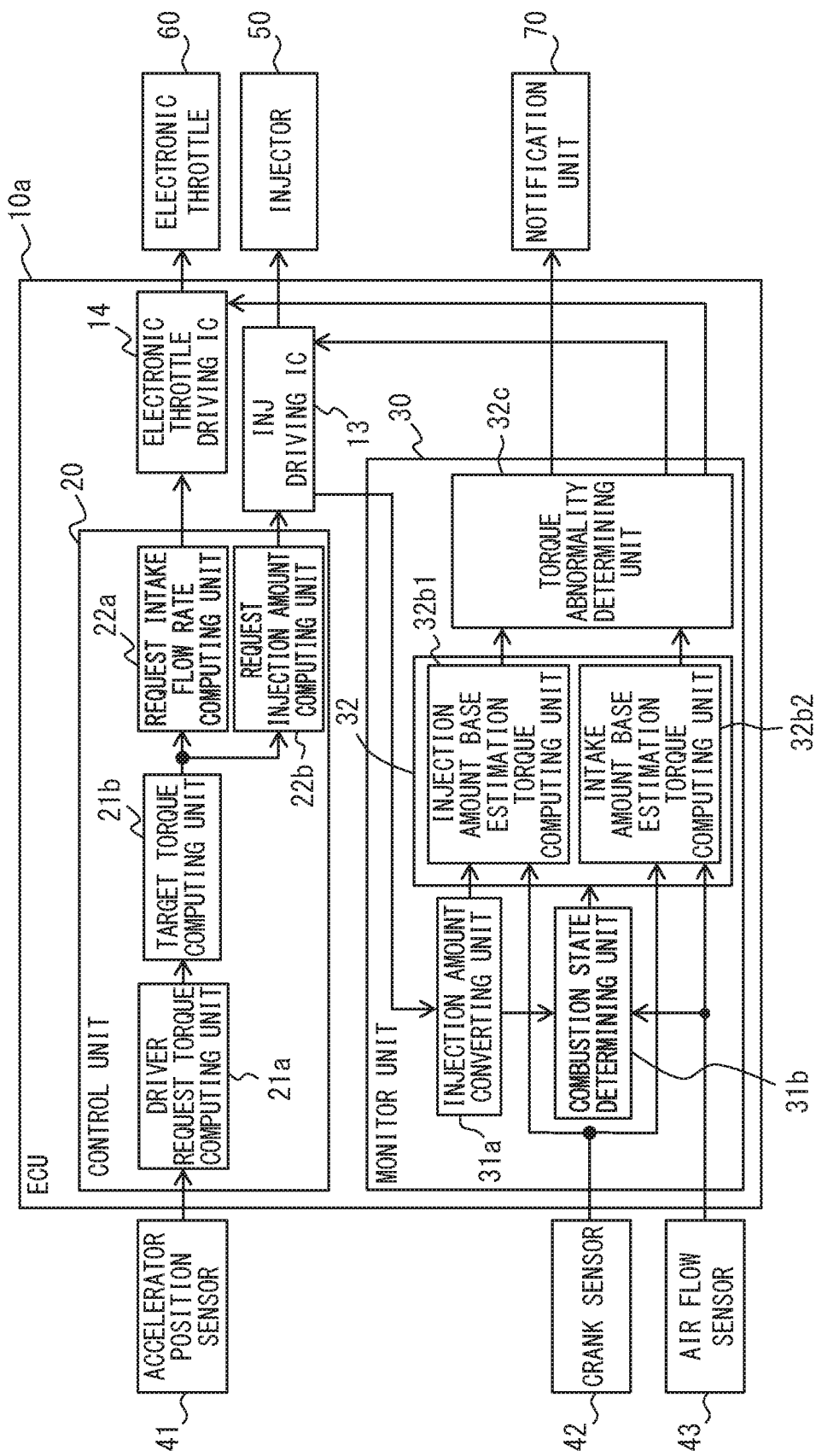
FIG. 2 is a block diagram illustrating a schematic configuration of a control unit and a monitor unit in the first embodiment.

As illustrated in FIG. 2, the fuel injection valve driving IC 13 is electrically connected to an injector 50. The fuel injection valve driving IC 13 has a switching element controlling power supply to the fuel injection valve of the injector 50 of the engine and interruption. The MCU 11 outputs an instruction signal (drive signal) to the switching element. The drive signal is a signal for driving the injector 50 and may be also called an injection drive signal.

Specifically, the MCU 11 computes a target injection amount as a target value of the period (that is, injection amount) of injecting fuel by the fuel injection valve on the basis of the various signals, and outputs an instruction signal according to the computed target injection amount to the fuel injection valve driving IC 13. In other words, the target injection amount is a required injection amount.

The MCU 11 drives the fuel injection valve of the injector 50 by controlling the switching element by the instruction signal to the fuel injection valve driving IC 13 and outputting a drive signal indicating power supply to the fuel injection valve of the injector 50 and a drive signal indicating interruption of the power supply. In other words, the MCU 11 outputs a drive signal to the injector 50 via the switching element in the fuel injection valve driving IC 13. The injector 50 corresponds to a fuel injection device.

As illustrated in FIG. 2, the electronic throttle driving IC 14 is electrically connected to an electronic throttle 60. The electronic throttle driving IC 14 has a switching element controlling power supply to an electronic throttle valve (electronic throttle) in the electronic throttle 60 of the engine and interruption of the power supply. The MCU 11 outputs an instruction signal to the switching element. Specifically, the MCU 11 computes a target opening angle as a target value of the valve opening angle of the electronic throttle on the basis of the above-described various signals and outputs an instruction signal in accordance with the computed target opening angle to the electronic throttle driving IC 14. In other words, the target opening angle is a required intake flow rate. The power supply to the electronic throttle valve (electronic throttle) may be also said as power supply to an electronic throttle motor.

By controlling the operation of the ignition device, the fuel injection valve, and the electronic throttle, the ECU 10a controls the combustion state of the engine. That is, the ECU 10a controls the combustion state of the engine while driving and controlling at least the injector 50. The target ignition timing, the target injection amount, and the target opening angle computed by the MCU 11 correspond to the target control amount as a target value of the control amount of controlling the combustion state of the engine.

The second communication unit 15 outputs various information acquired by the MCU 11 to the external ECU in response to an instruction from the MCU 11. The MCU 11 outputs, for example, a signal of an abnormal flag indicating occurrence of abnormality such as torque monitoring abnormality or air flow sensor abnormality to a display ECU controlling operation of a display device visually recognized by the vehicle driver via the second communication unit 15. The display ECU generates an alarm indication or an alarm sound when the signal of the abnormal flag is acquired. However, the present disclosure may achieve the object without generating an alarm indication or an alarm sound.

The CPU check unit 11d checks whether the CPU 11a and the memory 11m are normal or not by executing, for example, a check to see whether a program and data stored in the memory 11m is normal or not. As the check, for example, a parity check or the like may be employed.

The integration IC 16 has a not-illustrated memory, a CPU executing various programs stored in the memory, and the like. The integration IC 16 functions as a microcomputer monitor unit 16a or an electronic throttle cut unit 16b in accordance with a program executed by the CPU. The microcomputer monitor unit 16a monitors malfunction of the MCU 11 with reference to a check result of the CPU check unit 11d.

When the microcomputer monitor unit 16a detects abnormality, the integration IC 16 executes control of electronic throttle cutting such as regulation of the operation of the electronic throttle, that is, regulation of the intake amount of air into the engine. The electronic throttle cut unit 16b outputs an electronic throttle cutting instruction signal as a signal of instructing electronic throttle cutting to the electronic throttle driving IC 14. By outputting the electronic throttle cutting instruction signal, for example, regardless of the accelerator position, the integration IC 16 fixes the target opening angle to a predetermined opening angle which is preliminarily set to perform regulation so that an output of the engine becomes less than a predetermined output. Alternatively, the target opening angle is set to zero, thereby forcedly stopping the engine. In other words, by cutting energization to the electronic throttle driving IC 14, the electronic throttle cut unit 16b regulates the intake amount of air to the engine. The electronic throttle driving IC 14 operates by placing priority on the electronic throttle cutting instruction signal over the instruction signal output from the MCU 11.

The control unit 20 controls the combustion state of the internal combustion engine in accordance with the drive torque of the engine requested by the driver. That is, the control unit 20 computes the target control amount in accordance with the user request torque as the drive torque of the engine requested by the driver. On the other hand, the monitor unit 30 performs torque monitoring of whether it is a torque abnormal state or not by using request torque requested to the engine and estimation torque as an estimation value of the actual torque of the engine. As described above, the ECU 10a provides the internal combustion engine control system having the control unit 20 and the monitor unit 30. The torque abnormal state is a state where request torque and generated torque are abnormal. Therefore, in the case where requested torque is abnormal or in the case where generated torque is abnormal, it may be said as a torque abnormal state.

The control unit 20 will now be described. The control unit 20 performs at least switching control. The switching control is a control of switching the combustion state between lean-burn combustion and stoichiometric combustion. The control unit 20 also performs the switching control to satisfy a strict fuel consumption regulation. For example, the control unit 20 executes the lean-burn combustion to improve fuel consumption performance in a normal operation region such as low load or intermediate load and executes the stoichiometric combustion in a high-load region such as acceleration timing. In other words, the stoichiometric combustion is homogeneous combustion at the theoretical air fuel ratio (stoichiometric ratio).

As illustrated in FIG. 1, the control unit 20 has the functions of a request torque computing unit 21 and a drive signal output unit 22. The request torque computing unit 21 computes request torque as torque to be requested to the engine on the basis of various signals acquired from the input processing circuit 11b and the first communication unit 11c. Since the request torque is torque to be requested to the engine, in other words, an engine request torque.

With reference to FIG. 2, the request torque computing unit 21 will be described specifically. In FIG. 2, only the fuel injection valve driving IC 13 and the electronic throttle driving IC 14 among the plurality of ICs are illustrated.

The request torque computing unit 21 has a driver request torque computing unit 21a and a target torque computing unit 21b. The driver request torque computing unit 21a computes driver request torque on the basis of a sensor signal from the accelerator position sensor 41, that is, the accelerator position. The larger the accelerator position is, the driver request torque is computed to a larger value. For example, a map expressing the correlation between the accelerator position and the driver request torque is preliminarily stored in the memory 11m, and the driver request torque computing unit 21a computes driver request torque according to the accelerator position with reference to the map.

The driver request torque computing unit 21a may compute driver request torque on the basis of an engine rotational speed in addition to the accelerator position. In this case, the higher the engine rotational speed is, the driver request torque is set to a larger value. Alternatively, a map expressing correlations among the engine rotational speed, the accelerator position, and the driver request torque is preliminarily stored in the memory 11m, and the driver request torque computing unit 21a computes driver request torque according to the engine rotational speed and the accelerator position with reference to the map.

The target torque computing unit 21b computes engine request torque by using the driver request torque. For example, the target torque computing unit 21b computes engine request torque by dividing reserve included torque by torque efficiency. In short, the target torque computing unit 21b computes engine request torque by dividing a value acquired by adding total loss torque and reserve torque to the driver request value by torque efficiency.

In this case, the target torque computing unit 21b computes total loss torque by adding a pump loss, a friction loss, a loss torque learning value, and the like. Further, the target torque computing unit 21b adds driver request torque, total loss torque, and external request torque to compute loss-included torque. A concrete example of the external request torque is torque of an increase amount of power generation to increase a power generation amount by a generator driven by the internal combustion engine for the purpose of charging an in-vehicle battery.

The pump loss is an energy loss by resistance received from intake and exhaust when the piston of the engine reciprocates. The friction loss is a mechanical energy loss by friction with a cylinder when the piston of the engine reciprocates.

The target torque computing unit 21b computes reserve-included torque by adding reserve torque to loss-included torque. Specifically, the target torque computing unit 21b computes reserve torque by adding corresponding torque to each of an idle reserve, a catalyst warming reserve, and an auxiliary reserve. Idle reserve torque is torque corresponding to a torque increase amount to intentionally improve promptness by ignition advance from an ignition retard state in consideration of startability/acceleration performance at the time of idle driving of the internal combustion engine. Catalyst warming reserve torque is a value acquired by converting a loss amount of combustion energy used to increase exhaust temperature to torque at the time of executing warming control of increasing exhaust temperature in order to increase temperature of a catalyst which cleans exhaust of the internal combustion engine to an activation temperature or higher. The auxiliary reserve torque is torque required to drive an auxiliary device such as a generator using the internal combustion engine as a drive source. Each of the reserve torque is set in accordance with the operation state of the engine such as engine rotational speed, engine load, and water temperature.

Further, the target torque computing unit 21b computes torque efficiency on the basis of a maximum torque generation ignition timing (MBT ignition timing), knock learning included base retard amount and target lambda. The MBT ignition timing is an ignition timing at which the maximum torque is acquired and a timing which varies according to the engine rotational speed, engine load, water temperature, and the like. Since knocking tends to occur at the MBT ignition timing, ignition is required at a timing later than the MBT ignition timing by predetermined time, that is, at a timing retarded by predetermined angle. The retarded timing is called a base ignition timing. The retard angle amount (base retard angle amount) varies according to the engine rotational speed, engine load, water temperature, and the like.

When knocking is detected by a sensor, feedback control of performing correction so as to retard the ignition timing only by predetermined time may be executed. A learning control of making the retard correction amount (knock learning amount) reflected in the ignition timing controls of the next time and subsequent times is called knock learning. The timing in which the knock learning amount is reflected in the base ignition timing corresponds to the target ignition timing.

The control unit 20 computes a timing acquired by subtracting the target ignition timing from the MBT ignition timing as an MBT retard amount as a retard amount of the target ignition timing for the MBT ignition timing. The control unit 20 computes torque efficiency on the basis of the computed MBT retard amount and the target lambda.

The torque efficiency is the ratio of energy of an amount converted to rotational torque of the crankshaft in combustion energy in the combustion chamber. The smaller the MBT retard angle is, that is, the closer the target ignition timing to the MBT ignition timing is, the torque efficiency is computed to a higher value. The target lambda is a target value of the ratio (lambda) between air and fuel included in air-fuel mixture which is burned in the combustion chamber. The target torque computing unit 21b computes the torque efficiency to a value according to the target lambda. For example, a map expressing the correlations among the MBT retard amount, the target lambda, and torque efficiency is preliminarily stored in the memory 11m, and the target torque computing unit 21b computes the torque efficiency according to the MBT retard amount and the target lambda with reference to the map.

Each of the MBT ignition timing, the base ignition timing, and the target lambda is set by the control unit 20 in accordance with the operation state of the engine such as the engine rotational speed, the engine load, and the water temperature.

Learning control related to the knock learning is executed by the control unit 20. The ECU 10a according to the embodiment has a detection circuit detecting drive current or voltage output from the ignition driving IC 12. The control unit 20 computes engine request torque by using a detection value by the detection circuit. Specifically, an actual ignition timing is computed on the basis of the detection value, and learning control related to knocking learning is executed by using the actual ignition timing to compute a knock learning amount.

The engine request torque computing method employed here is just an example. The present disclosure is not limited to the method. That is, the engine request torque computing method is not particularly limited.

As illustrated in the diagram, the drive signal output unit 22 has a request intake flow rate computing unit 22a, a request injection amount computing unit 22b, and the like. The drive signal output unit 22 computes a target control amount in accordance with the engine request torque computed by the request torque computing unit 21 and outputs various instruction signals to the ICs 12 to 14 in accordance with the computed target control amount, thereby outputting drive signals to the actuators 50 and 60 and the like.

For example, the request intake flow rate computing unit 22a computes a request intake flow rate in accordance with the engine request torque computed by the request torque computing unit 21 and outputs an instruction signal to the electronic throttle driving IC 14 in accordance with the computed request intake flow rate. In such a manner, the request intake flow rate computing unit 22*a* outputs a drive signal to the electronic throttle 60. The request injection amount computing unit 22*b* computes a requested air-fuel ratio in accordance with the engine request torque computed by the request torque computing unit 21 and outputs an instruction signal to the fuel injection valve driving IC 13 in accordance with the computed request air-fuel ratio and the requested injection amount computed from the intake flow rate. In such a manner, the request injection amount computing unit 22*b* outputs a drive signal to the injector 50. The drive signal output unit 22 computes a requested ignition timing in accordance with the engine request torque computed by the request torque computing unit 21 and outputs an instruction signal to the ignition driving IC 12 in accordance with the computed request ignition timing.

Next, the monitor unit 30 will be described. The monitor unit 30 performs torque monitoring of whether it is a torque abnormal state or not by using the request torque which is requested to the engine and estimation torque as an estimation value of actual torque of the engine. As described above, the ECU 10*a* provides an internal combustion engine control system having the control unit 20 and the monitor unit 30.

The request torque is torque requested to the engine and is the same meaning as the request torque computed by the request torque computing unit 21 of the control unit 20. The request torque computed by the monitor unit 30 is a value used to monitor torque abnormality. On the other hand, the request torque computed by the control unit 20 is a value used to compute the target control amount for the engine. That is, the usage of the request torque for monitoring and that of the request torque for control are different. The request torque for monitoring and the request torque for control are values computed by programs stored in different regions in the storage region of the memory 11*m*.

As illustrated in FIG. 1, the monitor unit 30 has functions as an input assuring unit 31 and a torque monitor unit 32. The input assuring unit 31 has functions, as illustrated in FIG. 2, an injection amount converting unit 31*a* and a combustion determining unit 31*b*.

The input assuring unit 31 checks whether data of various signals acquired from the input processing circuit 11*b* and the first communication unit 11*c* is normal. In the case where the data is abnormal, the input assuring unit 31 executes data repair, data reacquisition, data disposal, and the like. By the execution, the monitor unit 30 may avoid various computations using abnormal data. That is, the input assuring unit 31 assures that various data used for computation by the monitor unit 30 is normal. As the check, in a manner similar to the above, a parity check or the like may be employed.

The input assuring unit 31 receives a drive signal of the fuel injection valve driving IC 13 and checks whether the drive signal is normal or not. The input assuring unit 31 diagnoses whether the torque monitoring by the torque monitor unit 32 is performed normally.

To compute an injection amount of fuel (hereinbelow, fuel injection amount) to the engine, the injection amount converting unit 31*a* acquires a drive signal (injection time) to the injector 50 from the fuel injection valve driving IC 13. The injection amount converting unit 31*a* acquires the engine rotational speed on the basis of a sensor signal from the crank sensor 42 to compute intake flow rate. Specifically, the injection amount converting unit 31*a* computes a fuel injection amount on the basis of a drive signal (injection time) to the injector 50 and also computes the engine rotational speed on the basis of a sensor signal from the crank sensor 42. The injection amount converting unit 31*a* acquires (estimates) an estimation intake flow rate as an estimation value of the intake flow rate by using the drive signal to the injector 50 and the engine rotational speed. The estimation intake flow rate corresponds to an estimation air flow rate.

First, the injection amount converting unit 31*a* acquires a fuel injection amount by using the acquired drive signal. That is, the injection amount converting unit 31*a* acquires an intake flow rate correlated with the acquired drive signal and the engine rotational speed. For example, a map expressing the correlation between the engine rotational speed and the fuel injection amount is preliminarily stored in the memory 11*m*, and the injection amount converting unit 31*a* acquires an intake flow rate according to the fuel injection amount and the engine rotational speed with reference to the map. In other words, the injection amount converting unit 31*a* converts the drive signal to a fuel injection amount. It may be also said that the injection amount converting unit 31*a* acquires an intake flow rate by using the fuel injection amount and the engine rotational speed. As described above, when the fuel injection amount and the engine rotational speed are known, the monitor unit 30 may roughly estimate the intake flow rate per unit time/per unit cylinder.

The combustion determining unit 31*b* determines whether the combustion state in the control unit 20 is lean-burn combustion or stoichiometric combustion. It is performed for the purpose of computing estimation torque which will be described later every combustion state. Preferably, the combustion determining unit 31*b* determines the combustion state executed in the control unit 20 by using a signal assured by the input assuring unit 31. Consequently, the combustion determining unit 31*b* may determine a combustion state properly.

Examples of the signals assured by the input assuring unit 31 are a sensor signal from a sensor measuring a physical amount contributing to combustion of the engine and a drive signal to an actuator controlling a physical amount contributing to combustion of the engine. Therefore, it is preferable that the combustion determining unit 31*b* determines whether the state is lean-burn combustion or stoichiometric combustion on the basis of at least one of the sensor signal assured by the input assuring unit 31 and the drive signal to the actuator assured by the input assuring unit 31. The combustion determining unit 31*b* is configured that it may acquire a sensor signal from the sensor measuring the physical amount contributing to combustion of the engine and the drive signal from the control unit 20 to the actuator.

Further, as a drive signal to the actuator, a drive signal of the injector 50 may be mentioned. On the other hand, as the sensor signal, a flow rate signal correlated with the intake flow rate supplied to the cylinder of the engine may be mentioned. In this case, the combustion determining unit 31*b* acquires the fuel injection amount computed by the injection amount converting unit 31*a*. The combustion determining unit 31*b* determines either the lean-burn combustion or stoichiometric combustion from the relation between the fuel injection amount and the flow rate signal. The injection amount converting unit 31*a* is included in the combustion state determining unit.

In the embodiment, as the flow rate signal correlated with the intake flow rate, a sensor signal output from the air flow sensor 43 as the sensor is employed. However, the present disclosure is not limited to it. As the flow rate signal, a sensor signal output from at least one of the air flow sensor 43, an intake pressure sensor, a throttle opening angle sensor, and the accelerator position sensor 41 may be employed. This point may be properly applied also to embodiments which will be described later.

In the embodiment, an example of determining the lean-burn combustion or the stoichiometric combustion from the relation between the fuel injection amount and the flow rate signal is employed. However, the present disclosure is not limited to the example. It is sufficient that the monitor unit 30 may determine whether the combustion state by the control unit 20 is the lean-burn combustion or the stoichiometric combustion.

As illustrated in FIGS. 1 and 2, the torque monitor unit 32 has functions as a request torque computing unit 32a, an estimation torque computing unit 32b, a torque abnormality determining unit 32c, and an electronic throttle cut control unit 32d. FIG. 1 illustrates mainly the parts which are simplified in FIG. 2. On the contrary, FIG. 2 illustrates mainly the parts which are simplified in FIG. 1.

The torque abnormality determining unit 32c computes the difference between the engine request torque computed by the request torque computing unit 32a and the estimation torque computed by the estimation torque computing unit 32b and determines a torque abnormal state when the difference is equal to or larger than a predetermined value.

When the torque abnormal state is determined, like the electronic throttle cut unit 16b, the electronic throttle cut control unit 32d outputs a signal instructing electronic throttle cutting and the like to the electronic throttle driving IC 14, thereby regulating the intake amount to the engine. When the torque abnormal state is determined, for example, the torque monitor unit 32 may cut energization to the fuel injection valve driving IC 13. That is, the torque monitor unit 32 regulates the fuel injection amount to the engine by cutting energization to the fuel injection valve driving IC 13 or the like. The regulation of the intake amount and regulation of the injection amount may be also said as avoiding procedure for avoiding occurrence of a malfunction due to the torque abnormal state.

When the torque abnormal state is determined, the torque abnormality determining unit 32c may generate an alarm indication or an alarm sound via a notification unit 70. In this case, the torque abnormality determining unit 32c instructs the notification unit 70 via the second communication unit 15 to generate an alarm indication or an alarm sound. However, the present disclosure may achieve the object even without generating an alarm indication or an alarm sound. For example, the request torque computing unit 32a computes engine request torque by adding catalyst warming request torque, idle request torque, driver request torque, and external request torque. The request torque computing unit 32a computes the engine request torque on the basis of various signals acquired from the input processing circuit 11b and the first communication unit 11c, which are signals assured by the input assuring unit 31.

In this case, the request torque computing unit 32a computes the catalyst warming request torque on the basis of catalyst warming target rotational speed and accelerator position. A target value of the engine rotational speed in a period in which warm-up control of increasing exhaust temperature is executed to increase the temperature of a catalyst which purifies exhaust of the engine to an activation temperature or higher is the catalyst warming target rotational speed. The request torque computing unit 32a computes catalyst warm-up request torque on the basis of the accelerator position and the catalyst warm-up target rotational speed in the period in which the warm-up control is executed.

The catalyst warm-up request torque is the same meaning as the catalyst warm-up reserve torque. The catalyst warm-up request torque computed by the monitor unit 30 is a value used to monitor torque abnormality. On the other hand, the catalyst warm-up reserve torque computed by the control unit 20 is a value used to compute the target control amount to the engine. That is, the catalyst warm-up request torque for monitoring and the catalyst warm-up reserve torque for control are values computed by the programs stored in different regions in the storage region of the memory 11m.

Although the catalyst warm-up target rotational speed and the accelerator position are written as examples of variables used for computation of the catalyst warm-up request torque in the embodiment, as other variables, water temperature, driver request torque, engine rotational speed, and intake charging efficiency may be mentioned. The intake charging efficiency is the ratio of flow rate of intake compressed in the combustion chamber to the flow rate of intake passed through the throttle valve. The request torque computing unit 32a computes the catalyst warm-up request torque by using at least one of the variables.

The larger the catalyst warm-up target rotational speed when the accelerator pedal is not stepped on is, the larger the catalyst warm-up request torque (reserve amount) is computed by the request torque computing unit 32a. The request torque computing unit 32a sets the catalyst warm-up request torque to a predetermined value when the accelerator position at the time the accelerator pedal is stepped on is less than a predetermined value, and sets to zero when the accelerator position is equal to or larger than the predetermined value. Further, the catalyst warm-up request torque may be increased/decreased according to water temperature or engine rotational speed and, particularly, the catalyst warm-up request torque may be increased/decreased according to the intake charging efficiency. The intake charging efficiency is the ratio of the flow rate of intake compressed in the combustion chamber to the flow rate of intake passed through the throttle valve.

The request torque computing unit 32a computes idle request torque on the basis of idle target rotational speed and engine rotational speed. The target value of the rotational speed in the period in which the idle control of stabilizing combustion by increasing torque at the time of idle operation of the engine is executed is idle target rotational speed. The request torque computing unit 32a computes the idle request torque on the basis of the engine rotational speed and idle target rotational speed in the period in which idle control is executed.

The idle request torque is equivalent to idle reserve torque. The idle request torque computed by the monitor unit 30 is a value used for monitoring torque abnormality. On the other hand, the idle reserve torque computed by the control unit 20 is a value used to compute the target control amount for the engine. That is, the idle request torque for monitoring and the idle reserve torque for control are values computed by programs stored in different regions in the storage region of the memory 11m.

Although the idle target rotational speed and the engine rotational speed are described as examples of the variables used to compute the idle request torque in the embodiment, as other variables, water temperature, vehicle speed, atmospheric pressure, and intake charging efficiency may be mentioned. The request torque computing unit 32a computes the idle request torque by using at least one of the variables.

The smaller the difference between the target rotational speed and the engine rotational speed when the accelerator pedal is not stepped on is, the larger the idle request torque (reserve amount) is computed by the request torque computing unit 32a. The smaller the accelerator position when the accelerator pedal is stepped on is, the larger the idle request torque is set by the request torque computing unit 32a. Further, the idle request torque may be increased/decreased according to water temperature or engine rotational speed and, particularly, the idle request torque may be increased/decreased according to the intake charging efficiency.

Although the above-described example may be employed as the engine request torque computing method by the request torque computing unit 32a, the present disclosure is not limited to the example.

The estimation torque computing unit 32b includes an injection amount base estimation torque computing unit 32b1 and an intake amount base estimation torque computing unit 32b2. In the following, the injection amount base estimation torque computing unit 32b1 will be simply described as an injection amount base computing unit, and the intake amount base estimation torque computing unit 32b2 will be simply described as an intake amount base computing unit.

The estimation torque has correlation with a fuel injection amount at the time of lean-burn combustion and has correlation with an intake flow rate at the time of stoichiometric combustion. Therefore, the estimation torque computing unit 32b includes the injection amount base computing unit 32b1 computing estimation torque on the basis of the fuel injection amount acquired by the injection amount converting unit 31a and the intake amount base computing unit 32b2 computing estimation torque on the basis of the intake amount acquired from the air flow sensor 43.

The injection amount base computing unit 32b1 computes, for example, estimation torque for the time of lean-burn combustion on the basis of the fuel injection amount and a sensor signal from the crank sensor 42. On the other hand, the intake amount base computing unit 32b2 computes, for example, estimation torque for the time of stoichiometric combustion on the basis of the intake amount and a sensor signal from the crank sensor 42.

As described above, the estimation torque computing unit 32b computes estimation torque in accordance with each of combustion states determined by the combustion determining unit 31b. That is, the estimation torque computing unit 32b computes estimation torque by using a reference parameter optimum to each combustion state from reference parameters which are different among the combustion states. In other words, the estimation torque computing unit 32b changes a reference parameter used to compute estimation torque every combustion state.

The injection amount base computing unit 32b1 computes, as lean estimation torque in which loss torque is not considered, a value acquired by multiplying lean maximum estimation torque based on the engine rotational speed and the fuel injection amount by torque efficiency derived from injection timing, fuel pressure, the number of injection stages, and the ratio between intake amount and fuel amount. The injection amount base computing unit 32b1 computes a value acquired by subtracting loss torque from the computed estimation torque as estimation torque for monitoring. The injection amount base computing unit 32b1 estimates drive torque which is actually output from the engine on the basis of various signals from the crank sensor 42, the air flow sensor 43, and the like acquired from the input processing circuit 11b and the first communication unit 11c, which are signals assured by the input assuring unit 31.

In this case, the injection amount base computing unit 32b1 estimates lean maximum torque under conditions of injection timing, fuel pressure, the number of injection stages, and the ratio between intake amount and fuel amount on the basis of engine rotational speed and fuel injection amount, and sets lean torque efficiency according to the injection timing, the fuel pressure, the number of injection stages, and the ratio between the intake amount and the fuel amount. The lean maximum torque becomes a small value when the injection timing advances and also when the injection timing retards. The larger the number of injection stages is, or the smaller the ratio between the intake amount and the fuel amount is, the larger value is computed as the lean maximum torque. For example, a map expressing the correlations among the engine rotational speed, the fuel injection amount, and the maximum torque is preliminarily stored in the memory 11m, and the injection amount base computing unit 32b1 computes lean maximum torque according to the engine rotational speed and the fuel injection amount with reference to the map.

The intake amount base computing unit 32b2 computes, as estimation torque in which loss torque is not considered, a value acquired by multiplying MBT estimation torque by torque efficiency. The intake amount base computing unit 32b2 computes, as estimation torque for monitoring, a value acquired by subtracting loss torque from the computed estimation torque. The intake amount base computing unit 32b2 estimates drive torque which is actually output from the engine on the basis of various signals from the crank sensor 42, the air flow sensor 43, and the like acquired from the input processing circuit 11b and the first communication unit 11c, which are signals assured by the input assuring unit 31.

In this case, the intake amount base computing unit 32b2 estimates actual drive torque (MBT estimation torque) of the engine when the ignition timing is MBT on the basis of intake charging efficiency and engine rotational speed. The higher the engine rotational speed is, or the higher the intake charging efficiency is, larger MBT estimation torque is computed. For example, a map expressing correlations among the engine rotational speed, the intake charging efficiency, and the MBT estimation torque is preliminarily stored in the memory 11m, and the intake amount base computing unit 32b2 computes the MBT estimation torque according to the engine rotational speed and the intake charging efficiency with reference to the map.

The intake amount base computing unit 32b2 computes the MBT ignition timing on the basis of the intake charging efficiency and the engine rotational speed. The intake amount base computing unit 32b2 computes base ignition timing on the basis of the intake charging efficiency and the engine rotational speed. In a manner similar to the computation of the MBT estimation torque, the MBT ignition timing and the base ignition timing are computed with reference to the map which is preliminarily stored in the memory 11m.

The intake amount base computing unit 32b2 computes a value acquired by subtracting the base ignition timing from the MBT ignition timing as a base retard amount. The intake amount base computing unit 32b2 computes torque efficiency on the basis of the base retard amount. The intake amount base computing unit 32b2 regards the knock learning amount as a predetermined amount which is preliminarily set or zero and computes torque efficiency.

The injection amount base computing unit 32b1 and the intake amount base computing unit 32b2 compute loss torque acquired by torque-converting loss energy including pump loss and friction loss on the basis of the engine rotational speed and water temperature. For example, a map expressing correlations among the engine rotational speed, the water temperature, and the loss torque is preliminarily stored in the memory 11m, and the injection amount base computing unit 32b1 and the intake amount base computing unit 32b2 compute the loss torque according to the engine rotational speed and the water temperature with reference to the map and switches on the basis of determination of the combustion determining unit 31b. Although the above-described example may be employed as the drive torque estimating method by the injection amount base computing unit 32b1 and the intake amount base computing unit 32b2, the method is not limited to the example.

The torque abnormality determining unit 32c performs torque monitoring by using estimation torque computed by the injection amount base computing unit 32b1 or estimation torque computed by the intake amount base computing unit 32b2 in accordance with the combustion state determined by the combustion determining unit 31b. Specifically, when lean-burn combustion is determined by the combustion determining unit 31b, the torque abnormality determining unit 32c performs the torque monitoring by using the estimation torque computed by the injection amount base computing unit 32b1. On the other hand, when stoichiometric combustion is determined by the combustion determining unit 31b, the torque abnormality determining unit 32c performs the torque monitoring by using the estimation torque computed by the intake amount base computing unit 32b2.

Figure 3:
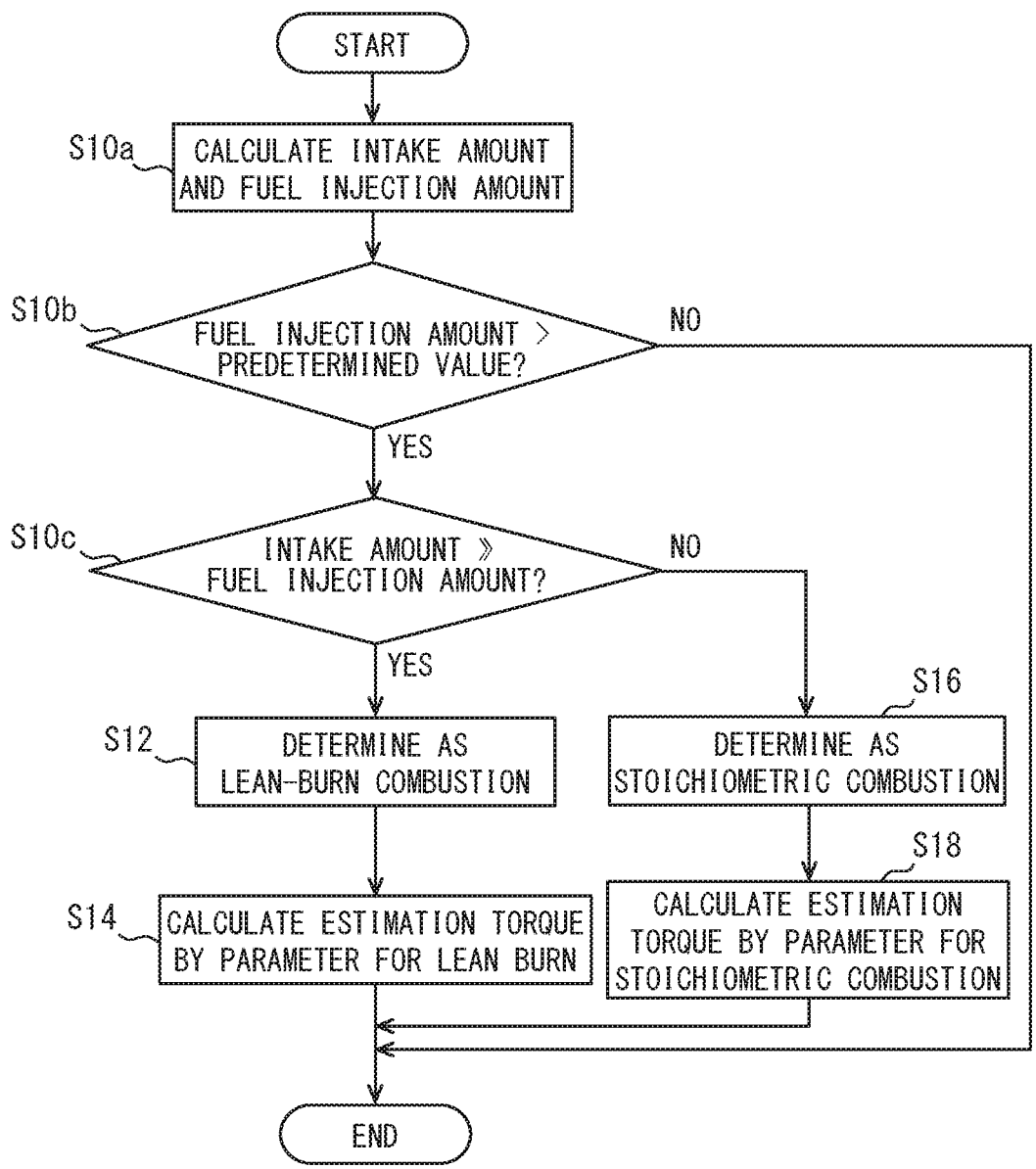
FIG. 3 is a flowchart illustrating process operations of the monitor unit in the first embodiment.

Referring to FIG. 3, the process operation of the monitor unit 30 will be described. The monitor unit 30 executes the processes illustrated in the flowchart of FIG. 3 every predetermined time.

In step S10a, the intake amount and the fuel injection amount are computed (combustion state determining unit). The combustion determining unit 31b computes the intake amount on the basis of a sensor signal output from the air flow sensor 43. It is performed to determine a combustion state. The injection amount converting unit 31a computes the fuel injection amount. The combustion determining unit 31b acquires the fuel injection amount from the injection amount converting unit 31a. It is performed to determine whether it is a state of cutting fuel injection by the injector 50 (fuel cutting time) and to determine the combustion state.

In step S10b, whether injection amount>predetermined value or not is determined (combustion state determining unit). The combustion determining unit 31b compares the fuel injection amount computed in step S10a with a predetermined value and determines whether injection amount>predetermined value or not in order to check whether the fuel injection from the injector 50 to the engine is stopped (fuel cutting time) or not.

The predetermined value is a value whether the fuel injection by the injector 50 is performed or not may be determined from the fuel injection amount. When "injection amount>predetermined value" is determined, the combustion determining unit 31b regards that it is not fuel cutting time and advances to step S10c. When "injection amount>predetermined value" is not determined, the combustion determining unit 31b regards that it is fuel cutting time and finishes the processes in FIG. 3.

The combustion determining unit 31b confirms that it is not fuel cutting time and moves to step S10c. In other words, the combustion determining unit 31b confirms that it is not fuel cutting time and determines the lean-burn combustion or the stoichiometric combustion. In the present disclosure, step S10b may not be executed.

There is the possibility that the combustion determining unit 31b erroneously determines the lean-burn combustion at the fuel cutting time. Therefore, in the case where the fuel cutting time is regarded, the combustion determining unit 31b holds a determination result of previous time, and may not switch computation of estimation torque which will be described later.

In step S10c, whether "intake amount»fuel injection amount" is satisfied or not is determined (combustion state determining unit). To check whether the combustion state by the control unit 20 is the lean-burn combustion or stoichiometric combustion, the combustion determining unit 31b compares the intake amount and the fuel injection amount computed in step S10a to determine whether "intake amount»fuel injection amount" is satisfied. That is, the combustion determining unit 31b determines whether the intake amount is much larger than the fuel injection amount or not.

At the time of lean-burn combustion, the control unit 20 increases the intake amount in order to decrease loss torque. Consequently, when "injection amount»fuel injection amount" is determined, the combustion determining unit 31b advances to step S12. When "injection amount»fuel injection amount" is not determined, the combustion determining unit 31b advances to step S16.

In step S12, the combustion determining unit 31b determines the lean-burn combustion (combustion state determining unit). On the other hand, in step S16, the combustion determining unit 31b determines the stoichiometric combustion (combustion state determining unit).

In step S14, estimation torque is computed by a parameter for lean-burn combustion (computing unit). As described above, the injection amount base computing unit 32b1 computes estimation torque on the basis of the fuel injection amount acquired in the injection amount converting unit 31a.

In step S18, estimation torque is computed by a parameter for stoichiometric combustion (computing unit). As described above, the intake amount base computing unit 32b2 computes estimation torque on the basis of the injection amount acquired from a sensor signal of the air flow sensor 43.

When it is diagnosed that the air flow sensor 43 is abnormal, the monitor unit 30 may generate an alarm indication or an alarm sound via the notification unit 70. In this case, the monitor unit 30 instructs the notification unit 70 via the second communication unit 15 to generate an alarm indication or an alarm sound. However, without generating an alarm indication or an alarm sound, the present disclosure may achieve the object.

As described above, the ECU 10a may compute correct estimation torque according to each of the combustion states in the control unit 20. Consequently, the ECU 10a may perform torque monitoring accurately.

Specifically, the estimation torque has correlation with an injection amount at the time of lean-burn combustion, and has correlation with an intake amount at the time of stoichiometric combustion. Consequently, in the ECU 10a, when the combustion determining unit 31b determines the lean-burn combustion, the injection amount base computing unit 32b1 computes estimation torque on the basis of a fuel injection amount. In the ECU 10*a*, when the combustion determining unit 31*b* determines the stoichiometric combustion, the intake amount base computing unit 32*b*2 computes estimation torque on the basis of the intake amount. Therefore, the ECU 10*a* may compute accurate estimation torque according to each of combustion states in the control unit 20.

The ECU 10*a* performs torque monitoring using the estimation torque computed by the injection amount base computing unit 32*b*1 in the case where the lean-burn combustion is determined, and performs torque monitoring using the estimation torque computed by the intake amount base computing unit 32*b*2 in the case where the stoichiometric combustion is determined. As described above, since the torque monitoring is performed by using accurate estimation torque according to each of the combustion states, the ECU 10*a* may perform the torque monitoring accurately.

Further, the ECU 10*a* determines either the lean-burn combustion or the stoichiometric combustion by using a sensor signal and a drive signal assured by the input assuring unit 31 of the monitor unit 30. Consequently, the ECU 10*a* may determine the lean-burn combustion or the stoichiometric combustion more accurately than the case of using signals which are not assured.

To assure determination of the combustion state for the torque monitoring by the monitor unit 30, assurance in safety design is necessary also for the entire software of the control unit 20. To perform the assurance of the control unit 20, there is the possibility that the load of monitoring is high and the design cost of a software designer of a system becomes high.

However, in the ECU 10*a*, since either the lean-burn combustion or the stoichiometric combustion is determined by using a sensor signal and a drive signal assured by the input assuring unit 31 of the monitor unit 30, the combustion state may be determined without requiring assurance of the control unit 20 as described above. That is, the ECU 10*a* may perform torque monitoring accurately without requiring assurance of the control unit 20 as described above.

As a measure against NOx which becomes a problem by taking the lean-burn combustion, there is a case that a NOx occlusion/reduction catalyst (LNT: Lean NOx Trap) is introduced. Rich-purge control executed to maintain the purification capacity of LNT is executed in the stoichiometric combustion to avoid rich accidental fire. Consequently, the present disclosure may accurately refer to estimation torque by the above-described combustion state determining method. That is, the present disclosure may simultaneously solve problems for an estimation torque deviation at the time of rich-purge control.

The preferred embodiment of the present disclosure has been described above. However, the present disclosure is not limited to the foregoing embodiment but may be variously modified without departing from the gist of the present disclosure. In the following, as other embodiments of the present disclosure, second to fourth embodiments will be described. The foregoing embodiment and the second to fourth embodiments may be singularly executed or properly combined. The present disclosure is not limited to combinations indicated in the embodiments but may be executed in various combinations.

Second Embodiment

Figure 4:
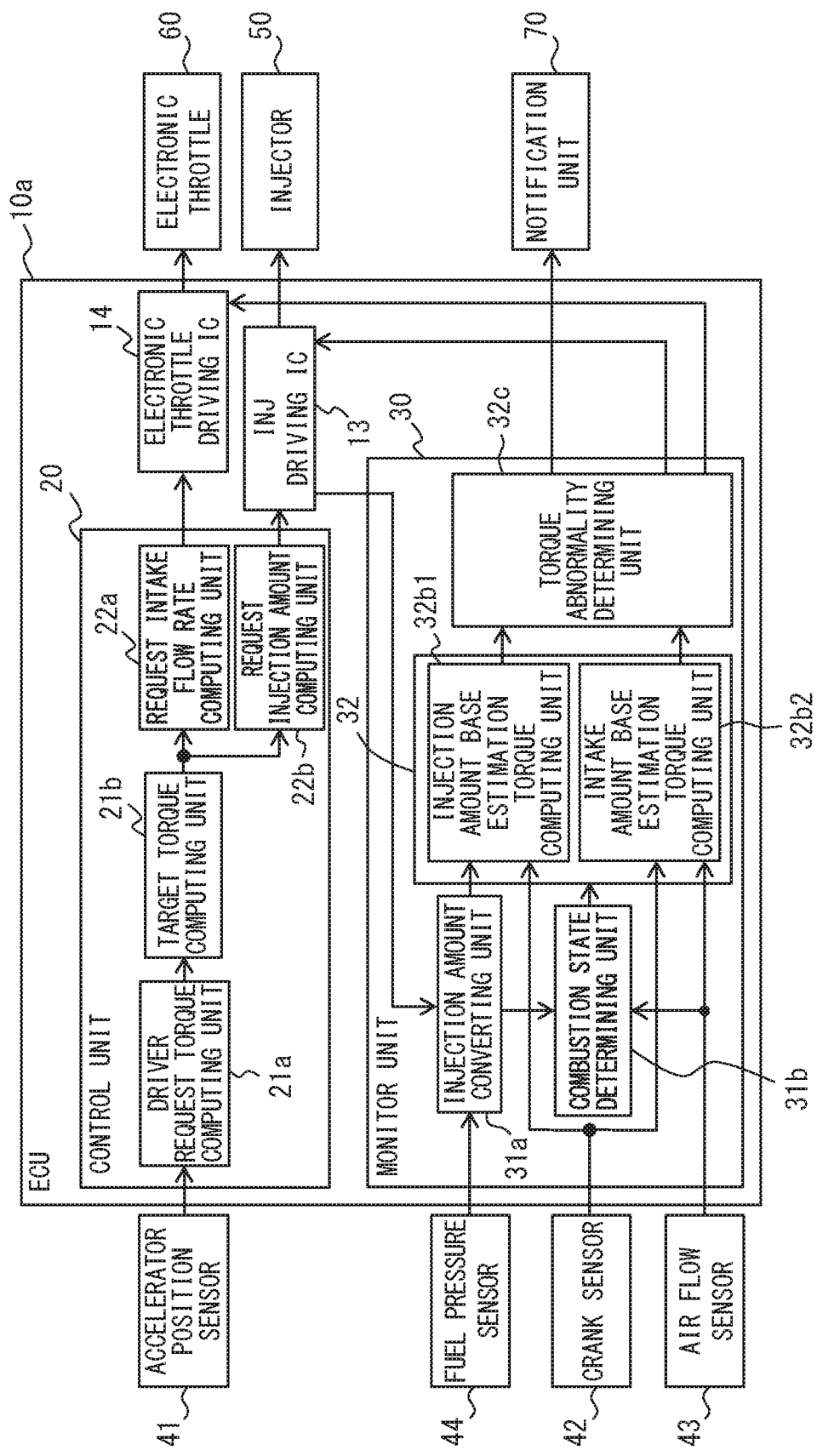
FIG. 4 is a block diagram illustrating a schematic configuration of a control unit and a monitor unit in a second embodiment.

Referring to FIG. 4, an ECU 10*b* in a second embodiment will be described. Since the ECU 10*b* has many similar parts as those of the ECU 10*a*, points different from the ECU 10*a* will be mainly described. The ECU 10*b* is different from the ECU 10*a* with respect to the point that a sensor signal from a fuel pressure sensor 44 is used.

The same reference numerals as those of the ECU 10*a* are designated to parts similar to those in the ECU 10*a*, in the ECU 10*b*. Therefore, the component of the same reference numeral as that in the ECU 10*a* in the ECU 10*b* may be applied with reference to the foregoing embodiment.

As illustrated in FIG. 4, the fuel pressure sensor 44 is electrically connected to the injection amount converting unit 31*a* in the monitor unit 30. Preferably, the injection amount converting unit 31*a* uses a sensor signal from the fuel pressure sensor 44, which is assured to be normal by the input assuring unit 31.

The fuel pressure sensor 44 outputs a sensor signal according to fuel pressure of an accumulator which accumulates fuel to be supplied to the injector 50 in a high-pressure state. The monitor unit 30 computes an intake amount by using the drive signal of the injector 50 and the fuel pressure acquired from the sensor signal of the fuel pressure sensor 44. Specifically, when the fuel pressure and injection time are known, the injection amount converting unit 31*a* may roughly estimate a fuel injection amount per unit time/per unit cylinder.

The second embodiment may produce effects similar to those of the foregoing embodiment. Further, since the monitor unit 30 of the second embodiment uses a sensor signal from the fuel pressure sensor 44 in addition to a drive signal of the injector 50, the precision of the fuel injection amount may be improved more than that in the foregoing embodiment.

Third Embodiment

Figure 5:
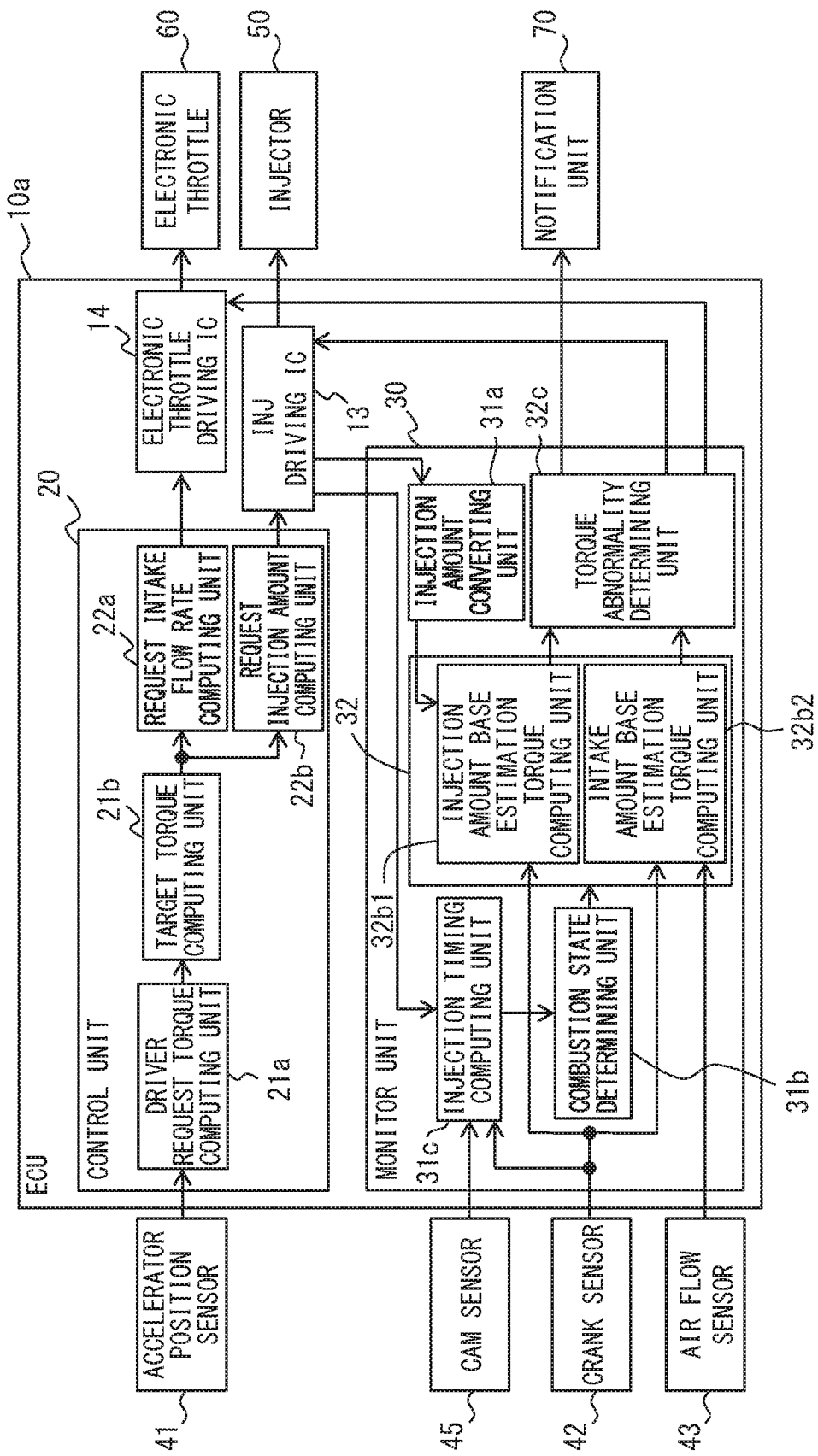
FIG. 5 is a block diagram illustrating a schematic configuration of a control unit and a monitor unit in a third embodiment.
Figure 6:
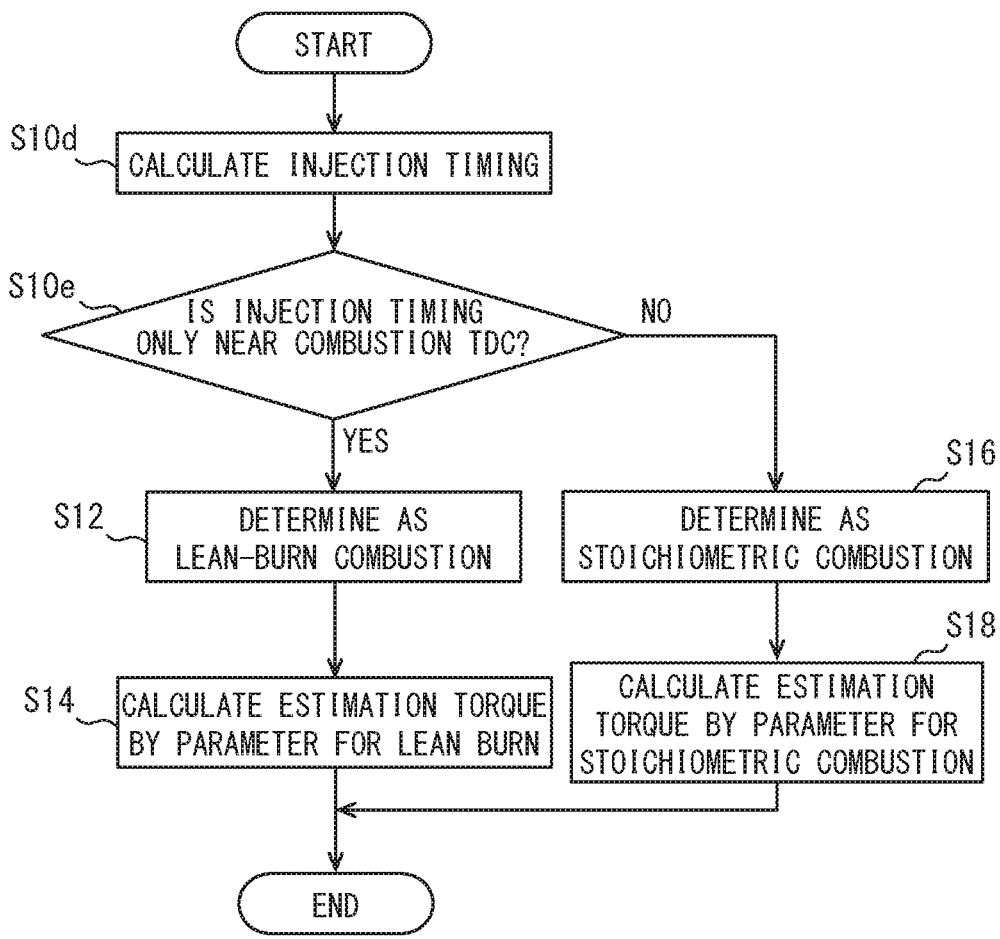
FIG. 6 is a flowchart illustrating process operations of the monitor unit in the third embodiment.

Referring to FIGS. 5 and 6, an ECU 10*c* of a third embodiment will be described. Since the ECU 10*c* has many parts similar to those of the ECU 10*a*, the points different from the ECU 10*a* will be mainly described. A combustion state determining method of the ECU 10*c* is different from that of the ECU 10*a*. The same reference numerals as those of the ECU 10*a* are designated to parts similar to those in the ECU 10*a*, in the ECU 10*c*. Therefore, the component of the same reference numeral as that in the ECU 10*a* in the ECU 10*c* may be applied with reference to the foregoing embodiment. In the third embodiment, the same step numbers as those in the foregoing embodiment are designated to processes of the embodiment. Although the combustion state determining method of the combustion determining unit 31*b* is different from that in the foregoing embodiment, the same reference numerals as those in the embodiment are employed for convenience.

As illustrated in FIG. 5, the monitor unit 30 has an injection timing computing unit 31*c*. A cam sensor 45, the crank sensor 42, and the fuel injection valve driving IC 13 are electrically connected to the injection amount converting unit 31*a* in the monitor unit 30. Therefore, the injection amount converting unit 31*a* is configured so as to be able to acquire a drive signal for driving the injector 50 and sensor signals from the cam sensor 45 and the crank sensor 42. Preferably, a signal assured to be normal by the input assuring unit 31 is input to the injection timing computing unit 31*c*.

The cam sensor 45 outputs a pulse-shaped sensor signal in accordance with the rotation of the camshaft. It may be also said that the cam sensor 45 outputs a crank angle signal as a sensor signal according to the rotational position of the camshaft of the engine.

The injection timing computing unit 31c is included in the input assuring unit 31. The injection timing computing unit 31c computes the injection timing of fuel by the injector 50 and the positional relation of the injection timing and compression stroke top dead center (hereinbelow, TDC). The injection timing computing unit 31c computes the positional relation between the injection timing of fuel to the engine and the TDC of the engine from a drive signal for driving the injector 50, a cam angle signal, and a crank angle signal. That is, the injection timing computing unit 31c computes a fuel injection timing and the positional relation between the computed fuel injection timing and the TDC. The injection timing computing unit 31c is included in the combustion state determining unit.

Usually, in the lean-burn combustion, injection is executed just before or before/after the TDC (compression stroke top dead center). On the other hand, in the stoichiometric combustion, injection is not so executed on the retard side (near the TDC) for combustion efficiency. Consequently, whether the combustion state is the lean-burn combustion or the stoichiometric combustion may be determined also by the injection timing.

The combustion determining unit 31b determines the lean-burn combustion in the case where the injection timing is just before or before/after the TDC, and determines the stoichiometric combustion in the case where the injection timing is not just before or before/after the TDC. As described above, the combustion determining unit 31b may determine either the lean-burn combustion or the stoichiometric combustion from the positional relation between the injection timing of fuel to the engine and the TDC of the engine. In the present disclosure, the injection timing computing unit 31c may compute the injection timing of fuel to the engine, and the combustion determining unit 31b may acquire the positional relation between the fuel injection timing and the TDC of the engine.

In the stoichiometric combustion, there is a case that split injection in which fuel is injected also near the TDC is executed. However, in this case, combustion is identified as the stoichiometric combustion. That is, in the present disclosure, depending on whether the injection timing is only near the TDC or not, the lean-burn combustion or the stoichiometric combustion is identified. In short, the combustion determining unit 31b determines the lean-burn combustion in the case where the injection timing is only near the TDC, and the combustion determining unit 31b determines the stoichiometric combustion in the case where the injection timing is not near the TDC. "Near the TDC" means just before the TDC or before/after the TDC.

Referring to FIG. 6, the process operation of the monitor unit 30 will be described. The monitor unit 30 executes processes illustrated in the flowchart of FIG. 6 every predetermined time.

In step S10d, the fuel injection timing is computed (combustion state determining unit). The injection timing computing unit 31c computes a fuel injection timing as described above. The injection timing computing unit 31c acquires the positional relation between the computed fuel injection timing and the TDC.

In step S10e, whether the injection timing is only near the TDC or not is determined (combustion state determining unit). By determining whether the injection timing is only near the TDC or not, the combustion determining unit 31b determines that the combustion state is either the lean-burn combustion or the stoichiometric combustion. The combustion determining unit 31b advances to step S12 when it is determined that the injection timing is only near the TDC and advances to step S16 when it is not determined that the injection timing is only near the TDC.

Although the combustion state determining method is different, the ECU 10c may produce effects similar to those of the ECU 10a.

Fourth Embodiment

Figure 7:
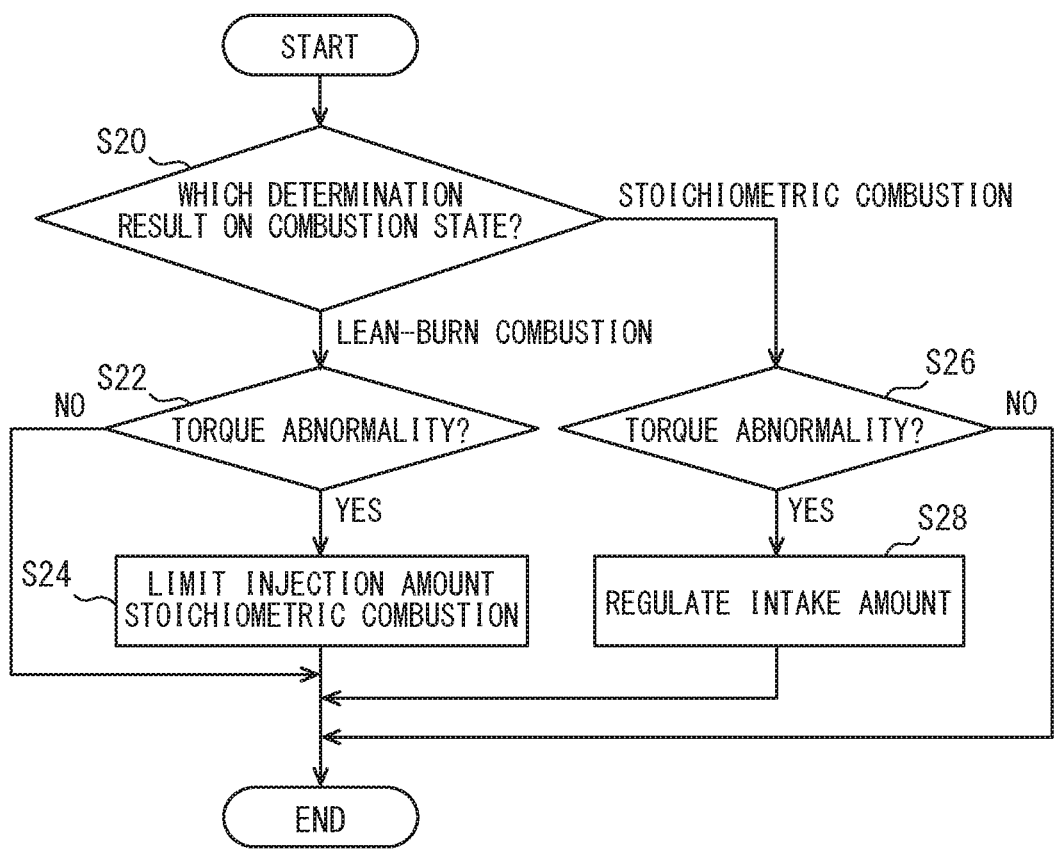
FIG. 7 is a flowchart illustrating process operations of a monitor unit in a fourth embodiment.

Referring to FIG. 7, an ECU of a fourth embodiment will be described. Since the ECU of the fourth embodiment has many parts similar to those of the ECU 10a, points different from the ECU 10a will be mainly described. The ECU of the fourth embodiment is different from the foregoing embodiment with respect to the point that an avoiding procedure is changed according to the combustion state. In the fourth embodiment, reference numerals similar to those of the first embodiment are employed for convenience.

The monitor unit 30 executes processes illustrated in the flowchart of FIG. 7 every predetermined time.

In step S20, a combustion state determining result is checked. The monitor unit 30 checks a determination result of the combustion determining unit 31b and determines whether the determination result is the lean-burn combustion or the stoichiometric combustion. This is performed to change the avoiding process in accordance with the combustion state. The monitor unit 30 advances to step S22 when it is determined that the determination result of the combustion determining unit 31b is the lean-burn combustion and advances to step S26 when it is determined that the determination result is the stoichiometric combustion.

In step S22, whether torque is abnormal or not is determined. The torque abnormality determining unit 32c determines whether it is the torque abnormal state or not as described above. The monitor unit 30 advances to step S24 when the torque abnormality determining unit 32c determines a torque abnormal state and finishes the processes of FIG. 7 when the torque abnormality determining unit 32c does not determine the torque abnormal state.

In step S24, an injection amount is regulated (injection amount regulating unit). The monitor unit 30 regulates a fuel injection amount to the engine by, for example, cutting energization to the fuel injection valve driving IC 13. In this case, the monitor unit 30 regulates the injection amount at the time when the torque abnormality determining unit 32c determines the torque abnormal state or in a period in which the torque abnormal state is determined.

In step S26, like in step S22, whether torque is abnormal or not is determined. The monitor unit 30 advances to step S28 when the torque abnormality determining unit 32c determines the torque abnormal state and finishes the processes in FIG. 7 when the torque abnormality determining unit 32c does not determine the torque abnormal state.

In step S28, the intake amount is regulated (intake amount regulating unit). The monitor unit 30 regulates the intake amount to the engine by outputting a signal of instructing the electronic throttle driving IC 14 to electronic throttle cutting to the electronic throttle driving IC 14 or the like. In this case, the monitor unit 30 regulates the intake amount at the time point the torque abnormality determining unit 32c determines a torque abnormal state or in a period in which the torque abnormal state is determined.

Although not the conventional art, in the internal combustion engine control system, in the case where injection-related abnormality is detected, even when abnormality is detected by a torque monitor for lean burn and injection is cut, engine stall occurs. Consequently, at predetermined engine rotational speed or higher, by cutting energization of the fuel injection valve driving IC, fuel injection is forcedly stopped. However, at low engine rotational speed, evacuation travel may be performed by wait-and-see control.

However, in the internal combustion engine control system, when fuel injection is forcedly stopped since the lean-burn combustion cannot be performed in a situation that stoichiometric combustion may be realized, restoration cannot be performed, resulting in engine stall. It may be also considered that engine stall caused by forcedly stopping fuel injection is one of safety measures. However, there is also a case that if evacuation travel cannot be performed, it is not preferable depending on environment conditions or the like. For example, it is not preferable that a vehicle travelling in an extremely cold area or the like cannot perform evaluation travel. Consequently, there is a case that, in the internal combustion engine control system, fuel injection is forcedly stopped only at the time of abnormality determination or only in an operation region in which the engine rotational speed and intake flow rate are equal to or larger than a predetermined amount, and restoration is desired in the other time.

As described above, in the case of the torque abnormal state during the stoichiometric combustion, the monitor unit 30 cuts energization of the electronic throttle driving IC 14. However, there is also a case that restoration is desired like the fuel injection valve driving IC 13. Consequently, by enabling cutting of energization of the electronic throttle driving IC 14 only in the period the torque abnormal state is determined, the monitor unit 30 may assure evacuation travel performance as well. For example, the monitor unit 30 may permit operation of the electronic throttle driving IC 14 up to an allowable threshold and cut energization of the electronic throttle driving IC 14 at the allowable threshold or larger.

The ECU of the embodiment may produce effects similar to those of the ECU 10a. Further, the ECU of the embodiment changes the avoiding procedure in accordance with each of the combustion states by the control unit 20, so that avoiding procedure adapted to each of the combustion states may be performed. The fourth embodiment may be applied also to the first to third embodiments.

The above-described internal combustion engine control system has the control unit 20 controlling a combustion state of an internal combustion engine in accordance with drive torque of the internal combustion engine requested by a driver and performing switching control which switches at least the combustion state between lean-burn combustion and stoichiometric combustion. The internal combustion engine control system also has the monitor unit 30, by using request torque which is requested to the internal combustion engine and estimation torque as an estimation value of actual torque of the internal combustion engine, performing torque monitoring which determines abnormality of the request torque and generated torque. The monitor unit has a combustion state determining unit (S10a to S10e, S12, and S16) determining whether the combustion state in the control unit is the lean-burn combustion or the stoichiometric combustion. The monitor unit further has a computing unit (S14 and S18) computing the estimation torque in accordance with each of the combustion states determined by the combustion state determining unit.

Therefore, the above-described configuration may compute accurate estimation torque according to each of the combustion states in the control unit. Consequently, the configuration may accurately perform torque monitoring while performing the switching control of switching the combustion state between the lean-burn combustion and the stoichiometric combustion.

Although the present disclosure has been described on the basis of the embodiments, it is to be understood that the present disclosure is not limited to the embodiments and the structures. The present disclosure includes various modifications and also changes in equivalency range. In addition, various combinations and modes and another combination or mode including only one element, or more or less fall within the scope and idea range of the present disclosure.

What is claimed is:

1. An internal combustion engine control system comprising:
   a control unit configured
      to control a combustion state of an internal combustion engine based on a drive torque of the internal combustion engine requested by a driver and
      to perform a switching control to switch at least the combustion state between lean-burn combustion and stoichiometric combustion; and
   a monitor unit configured to perform torque monitoring to determine abnormality of a request torque, which is requested to the internal combustion engine, and a generated torque of the internal combustion engine based on the request torque and an estimation torque, which is an estimation value of an actual torque of the internal combustion engine, wherein
   the monitor unit includes:
   a combustion state determining unit configured to determine whether the combustion state in the control unit is the lean-burn combustion or the stoichiometric combustion; and
   a computing unit configured to compute the estimation torque in accordance with the combustion state determined by the combustion state determining unit, wherein
   the monitor unit includes an injection amount regulating unit that is configured
      to regulate an injection amount of fuel to the internal combustion engine on determination of abnormality in the torque monitoring in a state where the combustion state determining unit determines that the combustion state in the control unit is the lean-burn combustion and
      not to regulate an injection of fuel to the internal combustion engine on determination of abnormality in the torque monitoring in a state where the combustion state determining unit determines that the combustion state in the control unit is not the lean-burn combustion.

2. The internal combustion engine control system according to claim 1, wherein
   the combustion state determining unit is configured to determine whether the combustion state in the control unit is the lean-burn combustion or the stoichiometric combustion based on at least one of
      a sensor signal from a sensor that measures a physical amount, which is assured in the monitor unit and contributes to combustion of the internal combustion engine and
      a drive signal for driving an actuator that controls a physical amount, which is assured in the monitor unit and contributes to combustion of the internal combustion engine.

3. The internal combustion engine control system according to claim 2, wherein the control unit is configured to control the combustion state while driving and controlling at least a fuel injection device, and the combustion state determining unit is configured to acquire, as the drive signal, an injection drive signal to drive the fuel injection device, to compute a fuel injection amount of the fuel injection device based on the injection drive signal, to acquire, as the sensor signal, a flow rate signal correlated with an air flow rate by which air is supplied to a cylinder of the internal combustion engine, and to determine whether the combustion state in the control unit is the lean-burn combustion or the stoichiometric combustion based on a relation between the fuel injection amount and the flow rate signal.

4. The internal combustion engine control system according to claim 3, wherein the combustion state determining unit is configured to acquire a fuel pressure of an accumulator that accumulates fuel in a high pressure state and to be supplied to the fuel injection device and to compute the fuel injection amount based on the injection drive signal and the fuel pressure.

5. The internal combustion engine control system according to claim 3, wherein the flow rate signal is output, as the sensor signal, from the sensor including at least one of an air flow meter, an intake pressure sensor, a throttle opening angle sensor, and an accelerator position sensor.

6. The internal combustion engine control system according to claim 2, wherein the combustion state determining unit is configured to acquire, as the drive signal, an injection drive signal of a fuel injection device to acquire, as the drive signal, a cam angle signal according to a rotational position of a camshaft of the internal combustion engine and a crank angle signal in accordance with the rotational position of the crankshaft of the internal combustion engine, to compute a positional relation between an injection timing of fuel to the internal combustion engine and a compression stroke top dead center of the internal combustion engine based on the injection drive signal, the cam angle signal, and the crank angle signal, and to determine whether the combustion state in the control unit is the lean-burn combustion or the stoichiometric combustion based on the positional relation.

7. The internal combustion engine control system according to claim 1, wherein the monitor unit includes an intake amount regulating unit that is configured to regulate an intake amount of air to the internal combustion engine on determination of abnormality in the torque monitoring in a state where the combustion state determining unit determines that the combustion state in the control unit is the stoichiometric combustion.

8. An internal combustion engine control system comprising:

a control unit configured to control a combustion state of an internal combustion engine based on a drive torque of the internal combustion engine requested by a driver and to perform a switching control to switch at least the combustion state between lean-burn combustion and stoichiometric combustion; and a monitor unit configured to perform torque monitoring to determine abnormality of a request torque, which is requested to the internal combustion engine, and a generated torque of the internal combustion engine based on the request torque and an estimation torque, which is an estimation value of an actual torque of the internal combustion engine, wherein the monitor unit includes:

a combustion state determining unit configured to determine whether the combustion state in the control unit is the lean-burn combustion or the stoichiometric combustion; and a computing unit configured to compute the estimation torque in accordance with the combustion state determined by the combustion state determining unit, the monitor unit includes an injection amount regulating unit that is configured to regulate an injection amount of fuel to the internal combustion engine on determination of abnormality in the torque monitoring in a state where the combustion state determining unit determines that the combustion state in the control unit is the lean-burn combustion, the combustion state determining unit is configured to determine whether the combustion state in the control unit is the lean-burn combustion or the stoichiometric combustion based on at least one of a sensor signal from a sensor that measures a physical amount, which is assured in the monitor unit and contributes to combustion of the internal combustion engine and a drive signal for driving an actuator that controls a physical amount, which is assured in the monitor unit and contributes to combustion of the internal combustion engine, the control unit is configured to control the combustion state while driving and controlling at least a fuel injection device, and the combustion state determining unit is configured to acquire, as the drive signal, an injection drive signal to drive the fuel injection device, to compute a fuel injection amount of the fuel injection device based on the injection drive signal, to acquire, as the sensor signal, a flow rate signal correlated with an air flow rate by which air is supplied to a cylinder of the internal combustion engine, and to determine whether the combustion state in the control unit is the lean-burn combustion or the stoichiometric combustion based on a relation between the fuel injection amount and the flow rate signal.

9. An internal combustion engine control system comprising:

a control unit configured to control a combustion state of an internal combustion engine based on a drive torque of the internal combustion engine requested by a driver and to perform a switching control to switch at least the combustion state between lean-burn combustion and stoichiometric combustion; and a monitor unit configured to perform torque monitoring to determine abnormality of a request torque, which is requested to the internal combustion engine, and a generated torque of the internal combustion engine based on the request torque and an estimation torque, which is an estimation value of an actual torque of the internal combustion engine, wherein the monitor unit includes:
- a combustion state determining unit configured to determine whether the combustion state in the control unit is the lean-burn combustion or the stoichiometric combustion; and
- a computing unit configured to compute the estimation torque in accordance with the combustion state determined by the combustion state determining unit, the monitor unit includes an injection amount regulating unit that is configured to regulate an injection amount of fuel to the internal combustion engine on determination of abnormality in the torque monitoring in a state where the combustion state determining unit determines that the combustion state in the control unit is the lean-burn combustion, the combustion state determining unit is configured to determine whether the combustion state in the control unit is the lean-burn combustion or the stoichiometric combustion based on at least one of
- a sensor signal from a sensor that measures a physical amount, which is assured in the monitor unit and contributes to combustion of the internal combustion engine and
- a drive signal for driving an actuator that controls a physical amount, which is assured in the monitor unit and contributes to combustion of the internal combustion engine, the combustion state determining unit is configured
- to acquire, as the drive signal, an injection drive signal of a fuel injection device,
- to acquire, as the drive signal, a cam angle signal according to a rotational position of a camshaft of the internal combustion engine and a crank angle signal in accordance with the rotational position of the crankshaft of the internal combustion engine,
- to compute a positional relation between an injection timing of fuel to the internal combustion engine and a compression stroke top dead center of the internal combustion engine based on the injection drive signal, the cam angle signal, and the crank angle signal, and
- to determine whether the combustion state in the control unit is the lean-burn combustion or the stoichiometric combustion based on the positional relation.

10. The internal combustion engine control system according to claim 1, wherein
the monitor unit includes an intake amount regulating unit that is configured to regulate an intake amount of air to the internal combustion engine on determination of abnormality in the torque monitoring in a state where the combustion state determining unit determines that the combustion state is the stoichiometric combustion.

* * * * *